Sept. 15, 1925.

W. N. MOTTER

MOTOR CONTROL SYSTEM

Filed May 17, 1920

1,553,626

Inventor
W. N. Motter
by his Attorney

Patented Sept. 15, 1925.

1,553,626

UNITED STATES PATENT OFFICE.

WILLIAM N. MOTTER, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

MOTOR-CONTROL SYSTEM.

Application filed May 17, 1920. Serial No. 382,681.

*To all whom it may concern:*

Be it known that WILLIAM N. MOTTER, a citizen of the United States of America, residing at Milwaukee, in the county of Milwaukee and State of Wisconsin, has invented a certain new and useful Improvement in Motor-Control Systems, of which the following is a specification.

This invention relates in general to motor control systems, and has particular relation to systems including one or more motors driving rolls or other apparatus, which require operation at any selected speed or a speed that bears a constant or definite ratio to the speed of another machine or driving motor.

In certain motor control systems wherein individual motors are used for driving rolls, or like machines, and means are provided for maintaining a definite ratio between the speeds of the several driving motors or between one or more of the driving motors and a control motor, it may happen that while a constant or definite speed ratio between several motors is maintained, nevertheless the actual speed of the control motor and the driving motors may vary.

It is an object of the present invention to provide an improved control system for motors designed to maintain a definite speed or speed ratio of the several motors, and including special provision for maintaining the actual speed of the motors substantially constant.

It is a further object of this invention to provide an improved method of operating motors and a control system therefor intended to permit operation of the motors at different speeds while preserving a definite relation between the speeds of the several motors throughout the range of operating speeds of the motors.

It is a further object of this invention to provide an improved system of control for motors wherein means are provided for insuring the operation of the motors at a selected speed ratio and for varying the speed of a motor and simultaneously varying the speed ratio between the latter motor and another motor.

It is a further object of this invention to provide an improved system of control for motors, including driving motors and a control motor, and automatically operative means for causing the control motor to operate at any selected speed.

It is a further object of this invention to provide an improved system of control for motors, including driving motors and a control motor, and automatically operative means for maintaining a selected constant speed of the control motor, and wherein the speed of driving motors may be readily controlled by varying a characteristic of the energy supplied to the control motor.

These and other objects and advantages are attained by this invention, the various novel features of which will appear from the description and drawings, disclosing several embodiments of the invention, and all these novel features are intended to be pointed out in the claims.

Figure 1:
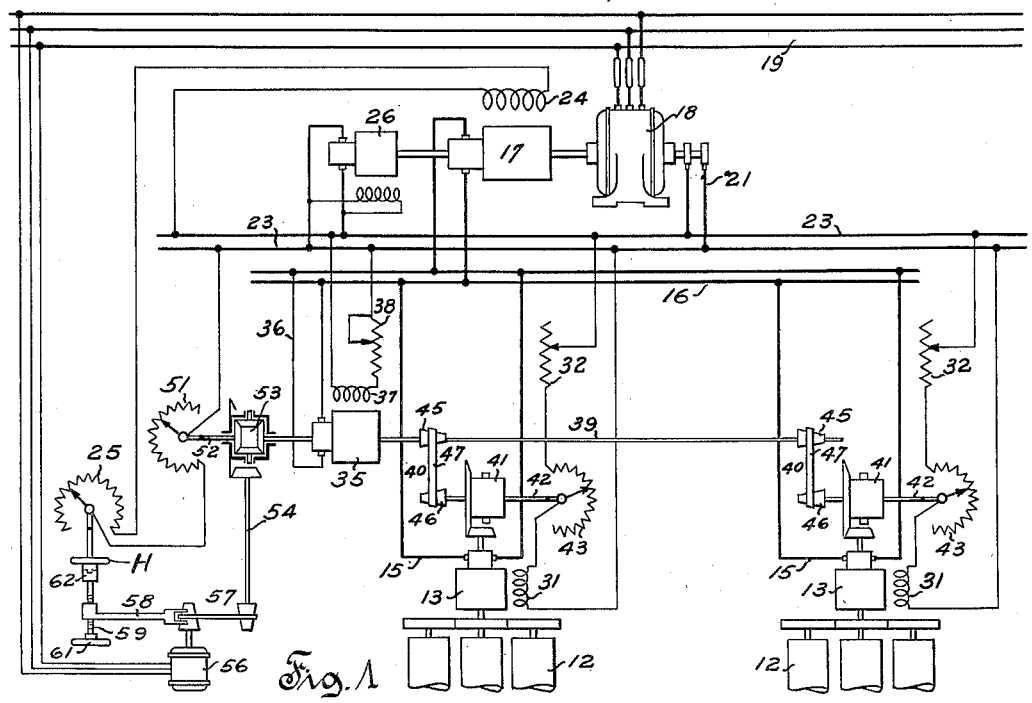
Fig. 1 is a diagrammatic showing of an embodiment of features of the invention.

In accordance with the disclosure of Fig. 1, one or more machines 12, which may be considered as groups of rolls of the type used in steel, paper, sugar, etc., mills, are each driven by an individual motor 13. The motor has its armature circuit 15 connected to a direct current source 16 of variable potential, this circuit 16 being supplied from a variable voltage generator 17, the latter forming part of a motor-generator set driven by a synchronous motor 18. The alternating current side of this motor is supplied from the alternating current circuit 19, and the direct current field of the motor is supplied through slip rings 21, from a direct current circuit 23, preferably of substantially constant potential. The energizing field 24 of the variable voltage generator 17 has a variable resistance in the form of rheostat 25 in circuit therewith, this rheostat being shown as provided with an actuating handle H. The direct current circuit 23 is supplied from a generator 26 on the shaft of the motor-generator set 17—18.

The fields of the motors 13 are designated 31 and each has a variable resistance 32 in circuit therewith, this field circuit being supplied from the constant potential circuit 23. It will be apparent that the speed of the motors 13 may be varied by varying the potential applied to the armatures thereof, that is, by varying the voltage of the variable voltage generator 17; and further variation in the speed of these motors may be secured by variation of the field resistance 32, this latter resistance being preferably adjusted so as to secure approximately the desired running speeds for the several motors under normal load conditions.

As a means for holding the speed of the motor or motors 13, and the machines driven thereby, substantially constant, or so as to maintain a definite ratio between the speeds of several of such driving motors, a control motor 35 is provided. The armature circuit 36 of this latter motor is supplied from the variable potential circuit 16, and the field circuit 37 is supplied from the constant potential circuit 23 preferably through a variable resistance 38. The motor 35 drives a shaft 39, and there is a mechanical connection, through a differential 41, between this shaft 39 on one side and the shaft of the motor 13 on the other side. Under normal conditions, that is, the proper speed relation between the shaft 39 and the motor 13, there is no resultant rotation of the shaft 42 connected to the differential. This shaft 42 is connected to the movable arm of a rheostat 43 in the circuit of the field 31 of the motor 13.

The mechanical connection from the control shaft 39 to one of the drive shafts of the differential 41 may be such as to drive the latter at only a single speed ratio, or this connection may be in the form of a mechanical speed-changing device 40 comprising cone pulleys 45 and 46 connected by a shiftable belt 47. Through this latter means, it will be apparent that, with the same speed of the control shaft 39, the motor 13 may operate at different speeds without producing any resultant rotation of the shaft 42 and consequent operation of the arm of the rheostat 43.

With the elements of the motor control system described up to this point, it will be apparent that the control motor 35 and the driving motors 13 may be operated at any speed desired by supplying the required potential to the armatures thereof from the variable voltage generator 17, and, if necessary, by manipulating the rheostat 32 in the field of each driving motor and the rheostat 38 in the field of the control motor. Due to the fact that the control shaft 39 constitutes no substantial load upon the motor 35, the latter will operate at a constant speed, depending upon its armature voltage and field resistance. Now, in case there should be any slowing down or speeding up of a motor 13, due to variations in load upon the machine driven thereby, this momentary change in speed, acting through the differential 41, produces operation of the shaft 42, resulting in operation of the arm of the rheostat 43 in the field of the motor whose speed has varied from normal. The rheostat arm is shifted in such direction as to bring the speed of the motor back to normal.

With a system of the character described, due to possible variation in the internal resistance of the motor 35 or the field circuit 24 of the variable voltage generator 17, there may be a tendency for the control motor 35, and the work motors 13, the speed of each of which bears a definite relation to that of the control motor, to operate at a speed other than the definite speed required. In certain cases, it is especially desirable that not only the speed ratio be maintained constant, but that the control motor and the work motors operate at a definite speed. It must be remembered that the differential-operated rheostat 43 is effective only to maintain a definite speed ratio between the work motor and the control motor 35 and will not cause the motor 35 to operate at any particular speed.

In order to prevent any variation in the speed of the motor 35, means are provided for impressing upon the motor 35 a voltage such as may be required to maintain the speed of this motor substantially constant. This means is in the form of a separate rheostat 51 in the circuit of the field 24, the arm of this rheostat being operable by a shaft 52 connected to the loose gear of a differential 53. One of the drive shafts of this differential is operated by the motor 35 and the other drive shaft 54 is operated by a synchronous motor 56 supplied from the circuit 19, or any other constant speed motor. In case the desired range of operating speeds for the motor 35 is rather limited, the connection between the synchronous motor 56 and the shaft 54 may be an ordinary geared or belted one; but in order to provide for satisfactory operation at widely varying speeds, there is provided a change-speed device 57, being here shown in the form of a pair of cone pulleys connected by a belt. A belt-shifter arm 58 is provided, this arm having an apertured and threaded portion through which a threaded rod 59 is operable, a manipulating handle 61 being provided upon this rod. A clutch 62 may be provided for connecting the rod 59 to the operating rod or handle H of the rheostat 25. Through this latter connection, it is possible, with the proper adjustment, to actuate the belt-shifter 58 to any definite extent required by a change in the position of the arm of the rheostat 25, whenever this rheostat is actuated to vary the speed of the control motor. This provision insures that the rheostat 51 can be designed to take care of the close speed adjustment of the motor 35 and the arm of this rheostat may be in a substantially mid-position independently of the position of the arm of rheostat 25.

In the operation of the system described, assume that, for any reason, such as heating of the field 24 of the generator 17, the resistance thereof is so increased as to decrease the voltage of the generator. As a result of such decreased voltage, the speeds of the control motor 35 and the driving motors 13 drop below normal. Due to the fact that the synchronous motor 56 is driving the shaft 54 at constant speed, there is a variation from the normal relation between the speeds of the shafts 39 and 54 and a consequent resultant rotation of the shaft 52 of the differential, causing operation of the rheostat 51 to decrease the resistance thereof to the required extent and increase the excitation of the generator 17 to a point where its voltage is such as to produce operation of the motor 35 at normal speed. Likewise, this same effect is produced in case the speed of the motor 35 should vary for any other reason, such as variation in the internal resistance of the motor.

Wide variation in the speed of the mill as a whole may be secured through manipulation of the rheostat 25 in the field of the generator 17, this having the effect of increasing or decreasing the potential on the armatures of the motors, and, if the speeds of the control motor and the driving motors 13 are varied to the same degree, there should be no appreciable operation of the differential-controlled rheostats 43, and thus no adjustment of the speed-changing devices 40 is necessary during variation in the speed of the mill as a whole in order to keep the arms of the controllers 43 within limits. The control motor and the driving motors may be of substantially the same speed characteristics, this being secured through proper design of the motors and preliminary adjustment of the resistances 38 and 32 in the fields of the respective motors, or otherwise. Then, variation in the voltage of the generator 17 has the effect of varying the speeds of the several motors while maintaining the speed relation of the motors substantially constant. Likewise, a limited variation in the speed of all the motors simultaneously while maintaining their speed relation constant might be secured in ways other than by varying the voltage of the generator 17, as described. Variation of the speed of the control motor and the driving motors by purposely varying a characteristic of the energy supplied to the several motors simultaneously readily permits variation of the speed of the driving motors while maintaining the same speed relation between these motors and the control motor; and this result is secured independently of the differentially-operated rheostat 43, thus allowing this rheostat to be of such type as best regulates for those differences in speed of the driving motors that may be occasioned through variations in the load on the several motors.

A limited effective range of variation in speed of the mill may be secured, without varying the voltage of the generator 17, by adjustment of the resistance 38 in the field of the control motor 35. This variation in speed of the control motor causes resultant operation of the shaft 42 and the controller 43 to vary the field resistance of the driving motor to such an extent as will produce a speed of the driving motor that bears the required relation to the new speed of the control motor. If the arm of the controller 43 approaches one of its effective working limits, it may be brought back to a normal position by adjusting the rheostat 32, in case it is not desired to alter the setting of the change-speed device 40. Of course, any variation in the speed of the motor 35 would require an appropriate adjustment of the speed change device 57, in order to maintain the controller rheostat in position to produce the same voltage at the terminals of generator 17.

Figure 2:
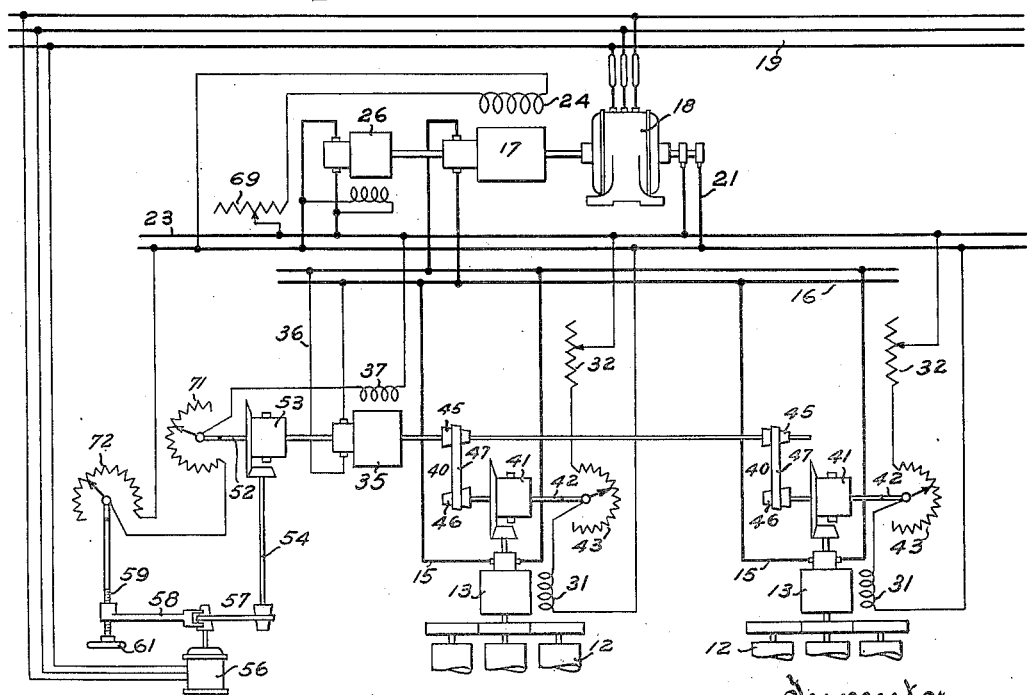
Fig. 2 is a diagrammatic showing of certain features of the invention disclosed in Fig. 1, along with other features of the invention.

In accordance with the disclosure of Fig. 2, variation of the resistance of the field circuit 24 of the generator 17 is secured through a variable resistance 69, and the differential 53 is effective, through the shaft 52, to operate a rheostat 71 in the field circuit 37 of the motor 35. With this arrangement, it will be apparent that on any variation in the speed of the motor 35, due to variation in the voltage supplied by the generator 17, or other reason, the rheostat 71 is operated to vary the resistance of the field circuit 37 to the extent required to bring the speed of the motor back to its predetermined normal value.

A controller 72, corresponding to the rheostat 25 of Fig. 1, is provided in series with the rheostat 71 in the field circuit of the motor 35. It will be apparent that changes in speed of the motor 35 may be secured through adjustment of the controller 72; and, through the connection between the operating rod 59 of the controller and the belt-shifter 58, the speed-changer 57 is actuated to the extent required to maintain the rheostat arm 71 at approximately a midpoint in its operative range for the new operating speed of the motor 35.

It will be apparent that, as to certain features of the invention, the automatically operated rheostat 51 or 71, actuated through the differential 53, may be omitted, in this latter case the speed of the control motor 35 being variable to vary the speed of the driving motors while maintaining a constant ratio of speed between the latter motors and the control motor.

In case it is required to change the speed ratio existing between any two of the driving motors 13, the desired result may be accomplished by adjusting the change-speed device between the differential 41 and the control shaft 39.

It should be understood that it is not desired that the invention claimed be limited to the exact construction shown and described, for obvious modifications will occur to a person skilled in the art.

It is claimed and desired to secure by Letters Patent:

1. In combination, a plurality of motors driving separate load elements, adapted to work successively on a continuous piece of material, a control motor, means for maintaining a substantially constant relation between the speeds of said control motor and each of said driving motors, a controller for varying the speed of said control motor, a constant speed shaft, means automatically operative to actuate said controller in response to a variation in the speed relation of said control motor and said constant speed shaft, a separate controller for said control motor, means for changing the speed relation between said constant speed shaft and said control motor, and an operative connection between said separate controller and said speed-changing means to insure dependent operation thereof.

2. In combination, a plurality of motors driving separate load elements, a control motor, means for maintaining a substantially constant relation between the speeds of said control motor and each of said driving motors, a source of energy supply for said control motor, a controller for said source of energy operable to cause variation in the speed of said control motor, a constant speed motor, a differential driven by said control motor and said constant speed motor, operating means for said controller operable through said differential on variation from normal of the speed relation of said control motor and said constant speed motor, means operative at the will of an operator for changing the speed relation between said constant speed motor and said control motor, additional controlling means for varying the speed of said control motor, said additional controlling means and said speed-changing means being operatively associated for dependent and substantially simultaneous operation.

3. In a motor control system, a plurality of motors, and means for insuring the maintenance of any one of a plurality of speed relations between said motors, said means comprising a controller for varying the speed of one of said motors, and additional means for varying the relation between the speeds of said latter motor and another of said motors, said additional means being operatively associated with said controller to insure operation of said additional means to vary the speed relation between said motors when said controller is operated to vary the motor speed.

4. In a motor control system, a plurality of motors, and means for insuring the maintenance of any one of a plurality of speed relations between said motors, said means comprising a mechanical connection between two of said motors, said mechanical connection including a speed-changing device, a controller for varying the speed of one of said motors, and a positive operative connection between said controller and said speed-changing device to insure substantially simultaneous operation of said controller and said speed-changing device.

5. In a motor control system, a plurality of motors driving separate load elements, means for insuring the maintenance of a predetermined speed relation between said motors while permitting operation thereof at variable speeds, said means including a control motor, a controller for varying the speed of said control motor, a constant speed shaft, and a mechanical connection between said control motor and said constant speed shaft, said connection including a speed-changing device, said speed-changing device and said controller being operatively associated for dependent and substantially simultaneous operation.

6. In combination, a plurality of motors driving separate load elements, a control motor, means for maintaining a constant relation between the speeds of said motors, means operative to simultaneously vary the speeds of all of said motors, and means for automatically maintaining the speed of said control motor substantially constant at any selected value.

7. In combination, a plurality of motors driving separate load elements, a control motor, a source of supply of variable voltage connected to said motors to permit operation thereof at variable speeds, a controller for varying the voltage of said source of supply to thereby vary the speeds of said motors simultaneously, and means operatively associated with said speed-varying means for insuring the operation of said control motor at a constant speed of any selected value.

8. In combination, a pair of motors, means responding to conditions dependent upon the speed of said motors for maintaining a constant selected speed relation between said motors, means for causing one of said motors to change in speed and for simultaneously changing the response of said first named means so that said motor will run at a new selected speed.

9. In combination, a pair of motors, speed responsive means for maintaining a constant selected speed relation between said motors, means for causing one of said motors to change in speed and for simultaneously changing the response of said speed responsive means so that said motor will run at a new selected speed.

10. In combination, a pair of motors, means differentially responsive to the speeds of said motors for maintaining a constant selected speed relation between said motors, means for causing one of said motors to change in speed and for simultaneously changing the action of said differentially responsive means so that said motor will run at a new selected speed.

11. In combination, a pair of motors, speed responsive means for maintaining a constant selected speed relation between said motors, a speed changer between said speed responsive means and one of said motors, means for adjusting the speed setting of one of said motors and means whereby operation of said adjusting means also adjusts said speed-changer.

12. In combination, a pair of motors, means differentially responsive to the speed of said motors for maintaining a constant selected speed relation between said motors, a speed changer between said differentially responsive means and one of said motors, means for adjusting the speed setting of one of said motors, and means whereby operation of said adjusting means also adjusts said speed changer.

13. In combination, a motor, another motor having a field and an armature element, regulating means for varying the voltage impressed on one of said elements, means responsive to the speeds of said motors for controlling said regulating means, additional means for varying the voltage impressed on said element, means for changing the response of said speed responsive means to one of said motors, and means whereby said regulating means and said response-changing means may be operated simultaneously.

14. In combination, a motor, another motor having a field element and an armature element, a regulating rheostat for varying the voltage impressed on one of said elements; means responsive to the speeds of said motors for controlling said regulating rheostat, a controlling rheostat for varying the voltage impressed on said element, means for changing the response of said speed responsive means to one of said motors, and means whereby said controlling rheostat and response-changing means may be operated simultaneously.

15. In combination, a motor, another motor having a field element and an armature element, a regulating rheostat for varying the voltage impressed on one of said elements, means differentially responsive to the speeds of said motors for controlling said regulating rheostat, a controlling rheostat in series with said regulating rheostat, means for changing the response of said differentially responsive means to one of said motors, and means whereby said controlling rheostat and response-changing means may be operated simultaneously.

16. In combination, a motor, another motor having a field element and an armature element, a regulating rheostat for varying the voltage impressed on one of said elements, a differential gearing responsive to the speeds of said motors for controlling said regulating rheostat, a controlling rheostat in series with said regulating rheostat, a speed changer between said differential gearing and one of said motors, and means whereby the said controlling rheostat and speed changer may be operated simultaneously.

17. In combination, a motor, means for maintaining the speed of said motor constant at a selected value including regulating means having a definite control range, means for changing said selected value, and means responsive to a change in said selected value whereby when said changing means is operated said regulating means is kept within its control range.

18. In combination, a motor, means for maintaining the speed of said motor constant at a selected value including regulating means having a definite control range, means for changing said selected value to an extent greater than that corresponding to the control range of said regulating means while at the same time maintaining said regulating means within its control range.

19. In combination, a motor, means for maintaining the speed of said motor constant at a selected value including regulating means having a definite control range, means for changing said selected value, means responsive to a change in said selected value whereby when said changing means is operated said regulating means may be kept substantially in the mid-position of its control range.

20. In combination, a plurality of motors driving separate elements successively operable on a continuous piece of material, a generator for supplying energy to said motors, means responsive to the voltage of said generator and controlling said motors, for maintaining said voltage at a constant selected value.

21. In combination, a plurality of motors driving separate elements successively operable on a continuous piece of material, a generator for supplying energy to said motors, a control motor responsive to the voltage of said generator and controlling said motors, means responsive to the speed of said control motor for regulating the voltage of said generator, and means other than said regulating means for varying the voltage of said generator.

22. In combination, a plurality of motors driving separate elements successively operable on a continuous piece of material, a generator for supplying energy to said motors, means responsive to the voltage of said generator and controlling the relative speeds of said motors, for maintaining said voltage at a constant selected value.

23. In combination, a plurality of motors driving separate elements successively operable on a continuous piece of material, a generator for supplying energy to said motors, a control motor responsive to the voltage of said generator and controlling the relative speeds of said motors, a constant speed shaft, means for regulating the voltage of said generator, and means differentially responsive to the speeds of said constant speed shaft and said control motor for controlling said regulating means.

24. In combination, a plurality of motors driving separate elements successively operable on a continuous piece of material, a generator for supplying energy to said motors, a control motor responsive to the voltage of said generator and controlling the relative speeds of said motors, a constant speed shaft, means for regulating the voltage of said generator, means differentially responsive to the speeds of said constant speed shaft and said control motor for controlling said regulating means, and means other than said regulating means for varying the voltage of said generator.

25. In combination, a plurality of motors driving separate elements successively operable on a continuous piece of material, a generator for supplying energy to said motors, a control motor responsive to the voltage of said generator and controlling the relative speeds of said motors, a constant speed shaft, means for regulating the voltage of said generator, means differentially responsive to the speeds of said constant speed shaft and said control motor for controlling said regulating means, and a speed-changer between said differentially responsive means and one of its driving means.

26. In combination, a plurality of motors driving separate elements successively operable on a continuous piece of material, a generator for supplying energy to said motors, a control motor responsive to the voltage of said generator and controlling the relative speeds of said motors, a constant speed shaft, means for regulating the voltage of said generator, means differentially responsive to the speeds of said constant speed shaft and said control motor for controlling said regulating means, a speed-changer between said differentially responsive means and one of its driving means, and means other than said regulating means for varying the voltage of said generator.

27. In combination, a plurality of motors driving separate elements successively operable on a continuous piece of material, a generator for supplying energy to said motors, a control motor responsive to the voltage of said generator and controlling the relative speeds of said motors, a constant speed shaft, means for regulating the voltage of said generator, and means differentially responsive to the speeds of said constant speed shaft and said control motor for controlling said regulating means, a speed-changer between said differentially responsive means and one of its driving means, and means other than said regulating means for varying the voltage of said generator, said other means and regulating means being arranged for simultaneous operation.

In testimony whereof, the signature of the inventor is affixed hereto.

WILLIAM N. MOTTER.